(12) United States Patent
Iftime et al.

(10) Patent No.: US 11,014,327 B2
(45) Date of Patent: May 25, 2021

(54) MATERIALS AND METHOD FOR JOINING FIBER REINFORCED PIPELINE

(71) Applicant: PALO ALTO RESEARCH CENTER INCORPORATED, Palo Alto, CA (US)

(72) Inventors: Gabriel Iftime, Dublin, CA (US); Martin Sheridan, Redwood City, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 681 days.

(21) Appl. No.: 15/848,348

(22) Filed: Dec. 20, 2017

(65) Prior Publication Data
US 2019/0186657 A1 Jun. 20, 2019

(51) Int. Cl.
*B32B 1/08* (2006.01)
*B29C 65/48* (2006.01)
(Continued)

(52) U.S. Cl.
CPC ............. *B32B 1/08* (2013.01); *B29C 65/02* (2013.01); *B29C 65/483* (2013.01); *B29C 65/488* (2013.01); *B29C 65/4875* (2013.01); *B29C 65/4885* (2013.01); *B29C 66/1142* (2013.01); *B29C 66/3452* (2013.01); *B29C 66/5221* (2013.01); *B29C 66/71* (2013.01); *B29C 66/721* (2013.01); *B29C 66/723* (2013.01); *B29C 66/7212* (2013.01); *C08K 3/00* (2013.01); *C08K 9/06* (2013.01); *C09J 5/06* (2013.01); *C09J 11/04* (2013.01); *C09J 163/00* (2013.01); *F16L 11/08* (2013.01);
*F16L 13/02* (2013.01); *F16L 13/103* (2013.01); *F16L 47/20* (2013.01); *B29K 2309/08* (2013.01); *C08K 3/36* (2013.01); *C08K 2201/005* (2013.01); *C09J 2423/046* (2013.01);
(Continued)

(58) Field of Classification Search
CPC . B32B 1/08; Y10T 428/139; Y10T 428/1393; F16L 11/08; F16L 13/02; F16L 13/103; C08K 3/36; C09J 11/04; C09J 163/00; B29C 65/487; B29C 65/4875; B29C 65/488; B29C 66/5221; B29C 66/7212
See application file for complete search history.

(56) References Cited

U.S. PATENT DOCUMENTS 5,470,622 A * 11/1995 Rinde .................... H01C 7/027
428/34.9
9,441,772 B2 * 9/2016 Pajak .................... F16L 1/028
(Continued)

FOREIGN PATENT DOCUMENTS

| WO | 03059993 A1 | 7/2003 |
|---|---|---|
| WO | 2011093799 A1 | 8/2011 |
| WO | 2017091904 A1 | 6/2017 |

*Primary Examiner* — Walter Aughenbaugh
(74) *Attorney, Agent, or Firm* — Miller Nash Graham & Dunn LLP

(57) ABSTRACT

A method of joining fiberglass-reinforced composite pipes includes joining an inner tube of each pipe by fusion to form a fused bond, joining fiber reinforced polymer tubes of each pipe by depositing a silica glass particle epoxy directly on the fused bond and on bonded edges of the fiber reinforced polymer tubes as a composition to cover tube edges and the fused inner tube bond, and curing the composition.

20 Claims, 2 Drawing Sheets

(51) Int. Cl.

| | | |
|---|---|---|
| *F16L 13/02* | (2006.01) | |
| *C09J 163/00* | (2006.01) | |
| *C09J 11/04* | (2006.01) | |
| *F16L 11/08* | (2006.01) | |
| *F16L 13/10* | (2006.01) | |
| *B29C 65/00* | (2006.01) | |
| *B29C 65/02* | (2006.01) | |
| *F16L 47/20* | (2006.01) | |
| *C08K 9/06* | (2006.01) | |
| *C08K 3/00* | (2018.01) | |
| *C09J 5/06* | (2006.01) | |
| *C08K 3/36* | (2006.01) | |
| *B29K 309/08* | (2006.01) | |

(52) U.S. Cl.
CPC ...... *C09J 2463/00* (2013.01); *Y10T 428/1393* (2015.01)

(56) References Cited

U.S. PATENT DOCUMENTS

2015/0086881 A1     3/2015   Zhamu et al.
2017/0058070 A1     3/2017   Iftime et al.

\* cited by examiner

US 11,014,327 B2

MATERIALS AND METHOD FOR JOINING FIBER REINFORCED PIPELINE

TECHNICAL FIELD

This disclosure relates to fiber glass-reinforced composite pipes, more particularly to joining pipelines.

BACKGROUND

Fiberglass-reinforced composite pipes (FRP) offer a low-cost and corrosion-free alternative to steel pipe for transporting high pressure compressed gases and liquids such as compressed hydrogen, natural gas (high content methane), carbon dioxide and oil. FRPs are considered to be the leading solution for transportation of corrosive gases including compressed hydrogen and high content hydrogen sulfide ($H_2S$) oil. One problem with FRP lies in properly joining the pipe segments in the field. The state-of-the-art FRP joining techniques use metal compression fittings sealed with O-rings. Another problem is related to repairing damaged in the field FRP pipes. Repairing requires replacing the damaged FRP pipe sections with new pipe and joining with metal compression fittings sealed with O-rings. However, metal compression fittings have limitations when used for transportation of compressed gases such as hydrogen and natural gas.

First, they suffer from major failure modes includes O-ring extrusion from the metal joint and corrosion of the metal parts. When the O-ring moves out of the metal joint, the metal becomes exposed to the hydrogen and corrodes. Second, the O-rings can contaminate the hydrogen, reducing fuel cell lifetime for fuel cells that use hydrogen. Third, due to their multi-component structures they are expensive.

Joining requires both leak-proof connections of the high-density polyethylene (HDPE) gas barrier layer, and the fiber-reinforced polymer layer. The lowest cost method for field assembly of FRP pipe systems consists of adhesive bonded joints. However, the current particle-reinforced adhesives cannot provide sufficient mechanical robustness of the joint. The primary factors responsible for the poor mechanical performance includes the absences of inter-particle connections and the absence of a robust structured order.

US Patent Application Publication No 2017/0058070 presents a general discussion of mechanically robust, chemically linked, particle networks. However, that discussion focuses on single layer networks, not multi-layer joints.

SUMMARY

An embodiment is a method of joining fiberglass-reinforced composite pipes that includes joining an inner tube of each pipe by fusion to form a fused bond, joining fiber reinforced polymer tubes of each pipe by depositing a silica glass particle epoxy directly on the fused bond and on bonded edges of the fiber reinforced polymer tubes as a composition to cover tube edges and the fused inner tube bond, and curing the composition.

An embodiment is a joint between two fiberglass-reinforced composite pipes that includes a fused bond in a gas barrier layer consisting of an inner tube of each pipe fused together, and a silica glass particle epoxy network formed directly on the fused bond and on bonded edges of the fiberglass-reinforced composite pipes.

An embodiment is of a method of producing a silica filled curable epoxy formulation that includes dispersing silica particles with surface chemical functions identical to one of either a hardening part or an epoxy part of an epoxy adhesive using mixing equipment, adding the other of either the hardening part or the epoxy part of the epoxy adhesive and mixing to form the silica filled curable epoxy, applying the silica filled curable epoxy to a surface, and curing the silica filled curable epoxy to form a curable material, wherein the curable material produces chemically linked silica particles networks and wherein a concentration of the silica particles in the epoxy has a range of 5 to 80 percent.

DETAILED DESCRIPTION OF THE EMBODIMENTS

Figure 1:
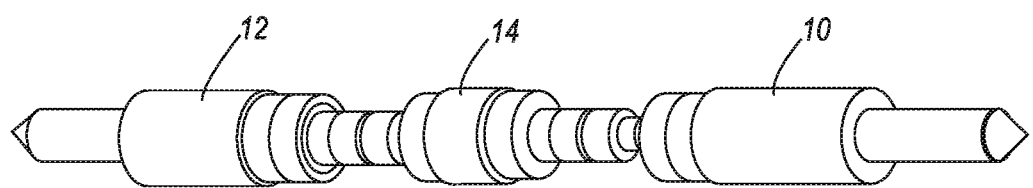
FIG. 1 shows a prior art embodiment of a joint between fiber reinforced pipes.

FIG. 1 shows a prior art metal compression fitting. Each piece of the high-density polyethylene (HDPE) pipe has a metal compression fitting. Each compression fitting 10 and 12 typically involves O-rings and using compression to 'bond' the metal fittings to the pipe. The two compression fittings 10 and 12 are then joined by a mating fitting 14.

Issues arise with these types of fittings when transporting gases such as hydrogen, natural gas, as well as liquids. These fittings fail because the O-ring extrudes from the fitting, essentially breaking the seal. Particularly, with compressed hydrogen transportation, hydrogen contamination from the O-ring materials affects the fuel cell lifetime. The multi-component nature of the fittings makes them expensive. In general, adhesives bonded joints have the lowest cost. However, the current particle-reinforced adhesives cannot provide sufficient mechanical robustness to the joint. They lack inter-particle connections and the absence of a robust structured order.

The embodiments here involve an inner joining area with an enhanced gas barrier layer provided by heat fusion joining of the high-density polyethylene (HDPE) liner. An outer high-strength, glass-reinforced structural layer joining the fiber glass-reinforced composite pipes (FRPs) consists of a novel silicon dioxide ($SiO_2$), also called silica, particle composite material. Glass fiber used in the fabrication of FRPs is formed by extrusion of small strands of mostly silica ($SiO_2$) based formulations into fibers with small diameters. The "glass" particle network has similar chemical structure to the glass fiber, both consisting mostly of silica. As such, the adhesive joint has thermos-mechanical behavior that resembles that of the FRP material, a key requirement for long serviced fiber reinforced polymer (FRP) pipelines. Free particles dispersed in a polymer matrix can move under the mechanical stresses to which pipelines are routinely exposed. Therefore. they make only a limited improvement to the mechanical strength of the joint when compared to the polymer material alone.

Chemically linked particle networks restrict the movement of the reinforcing particles under mechanical and thermal stresses. As a result, the material has outstanding thermo-mechanical performance when compared with current adhesives. The cured material forms structured, chemically linked $SiO_2$ particle networks, which resemble the mesh fiberglass. Two major differences exist, however.

First the fiber glass/polymer epoxy is built in-situ therefore eliminating the layer-by-layer tedious FRP building process currently required. Second, fiber glass has in-plane linking, but the embodiments here have three-dimensional fiber glass epoxy composite structures. These structures incorporate both in-plane and inter-plane chemical links between the constituting glass fibers. This further strengthens the joint in the circumferential direction where the internal pressure creates the highest stress.

Figure 2:
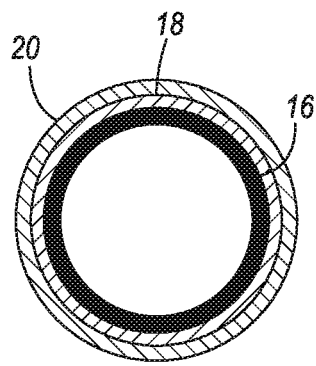
FIG. 2 shows an example of a fiber reinforced pipe.

FIG. 2 shows an example of an FRP. An FRP typically consists of an inner high density polyethylene (HDPE) layer 16. A fiber glass composite layer, typically a fiber glass reinforced epoxy layer 18 surrounds the inner liner. An outer wear layer 20 may consist of another composite or polymer layer.

Figure 3:
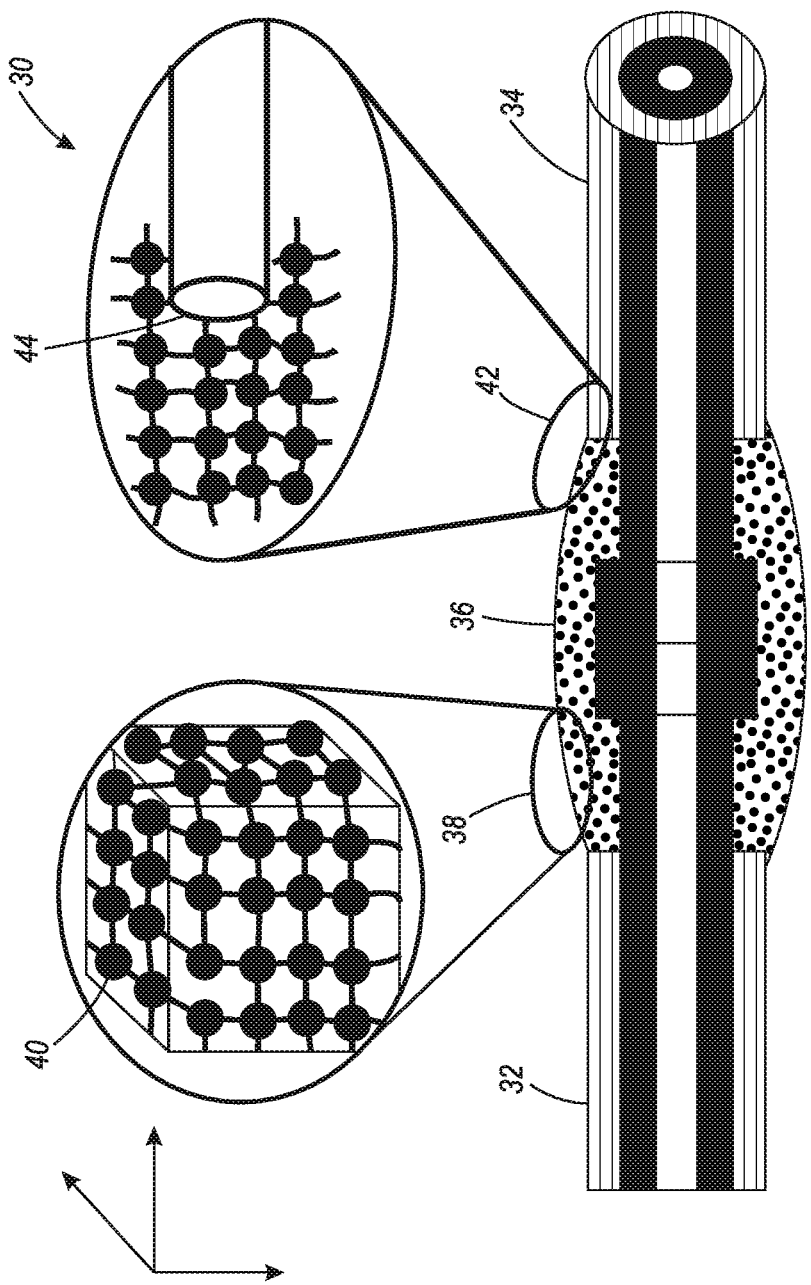
FIG. 3 shows an embodiment of a bond between two fiber reinforced pipes.

The embodiments here begin with joining the HDPE inner layer or tube. The heat fusion process consists of heating two surfaces to a designated temperature to melt the edges of the surfaces to be joined, and then bringing the two melted surfaces together and holding them against each other by applying a suitable force and allowing the joint to cool while maintaining the appropriate applied force. This applied force joins the melted surfaces resulting in a permanent, monolithic fusion joint after cooling back to ambient temperature. Fusion bonding of the HDPE liner creates the perfect seal at the molecular level by keeping uniform material composition along the joint. This provides joints with a better than state of the art leak rate. As shown in FIG. 3, the inner HDPE joint 36 is a heat fused joint.

In a second process, an active glass, particle reinforced epoxy bonding material is used as a putty or composition. The process then thermally cures this epoxy to produce high-strength joins. This bond 40 of region 38, shown in FIG. 3, is a cross-linked three-dimensional glass (silica) particle network. It provides the HDPE layers a joint with hydrostatic and tensile strengths exceeding those achievable with current technologies. Joint 44 between the outer fiber glass layer from region 42 form a joint having direct chemical bonding of the silica particles onto the edges of the glass fiber structures. Direct bonding of the chemically linked particles networks onto the exposed glass fibers present onto bonded FRPs further increase the adhesion strength between adhesive particles and FRP substrates to levels that cannot be achieved with conventional particle filled adhesives.

The present adhesive material is delivered as viscous composition consisting of chemically functionalized $SiO_2$ particles dispersed in a reactive material base. This material base produces solid high strength structures by a heat-initiated coupling reaction between the functional groups present on the silica particles surface and the reactive base material.

The silica particles have a shape including spherical, cylinder, plate, fiber or random. Generally speaking, non-spherical particles are preferred because they may provide a higher surface area for bonding interactions with the substrates and in between the particles, both physical and chemical interactions.

The concentration of silica particles in the adhesive formulation is comprised in a range from about 5% to about 80%, more specifically from 10% to 70%. Higher particle concentrations are advantageous for increasing the bonding strength when compared with simple epoxy adhesives.

The particle size in any one direction of the silica particles may range from 5 nm to about 50 microns, more specifically in a range from 10 nm to 5 microns.

Generally speaking, conventional two-part epoxy adhesives consist of a part A epoxy material, and a part B hardener. The reinforcing particles disclosed in the present embodiment can be present in the epoxy or hardener of an epoxy adhesive. Just prior to deposition, the parts A and B are mixed, such as with a high energy mixer.

The choice of placing the functionalized particles in the epoxy (part A) or the hardener (part B) is dictated by the type of functional groups present in particles. These particles must be stable in the base material. For example, functionalized particles in the hardener must not react with the hardener but must react with the epoxy when the hardener/particle dispersion is mixed with the epoxy. Similarly, functionalized particles in epoxy must not react with the epoxy material but must react with the hardener when the epoxy/particle dispersion is mixed with the hardener. Whichever component is mixed with the functionalized particles, there may be beneficial to use a high shear mixer such as a planetary mixer.

One embodiment involves functionalized silica particles dispersible in the hardener material. The hardener materials contain mostly reactive amino groups. Suitable functionalized silica particles that are stable and dispersible in hardener material include particles possessing groups such as amino groups like —$NH_2$, —NHR, alcohol groups —OH, and carboxylic acid groups, —COOH. A hardener formulation containing such functional particles will cure when mixed with the epoxy component (part B) either at room temperature or by heating due to the coupling reaction between these functional groups and the epoxy groups, as it is well known to those skilled in the epoxy adhesives.

The process for fabrication of amino functionalized silica particles depends on the coupling functional groups present in the silica particles.

One method for introduction of amino groups onto silica particles involves surface functionalization of the silica particles with amino functionalized silane coupling reagents. Amino silane coupling agents have a general structure such as H2N—(X)—$Si(OR)_3$ where the —$Si(OR)_3$ groups that react selectively with the —OH groups present on the particles' surface to produce particles terminated with amino groups as illustrated in the figure below:

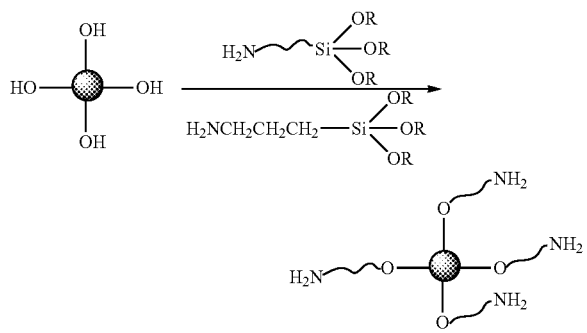

In a further embodiment, wherein the functionalized particles are dispersed in the hardener (part B), the reactive functional groups of are either —COOH or —OH groups. Most often, particles of silica ($SiO_2$) have hydroxyl groups present onto their surface.

A second embodiment involves functionalized silica particles dispersed in the epoxy material (part A). Suitable examples include epoxy functionalized silica particles because they are stable and compatible with epoxy base materials. Epoxy functionalized particles can be fabricated by reacting —OH or —COOH functional groups present on the surface of the particles with epoxy-containing reagents of a general structure X—(R)-Epoxy, where X reacts selectively with —OH and —COOH groups. One reactive X function is an epoxy group.

The curing process involves reaction of the functionalized silica particles with reactive coupling groups present on chemical linkers present in the base material. When using amino functionalized particles, the base material is a multifunctional epoxy material. The chemical process involve in the curing is illustrated below:

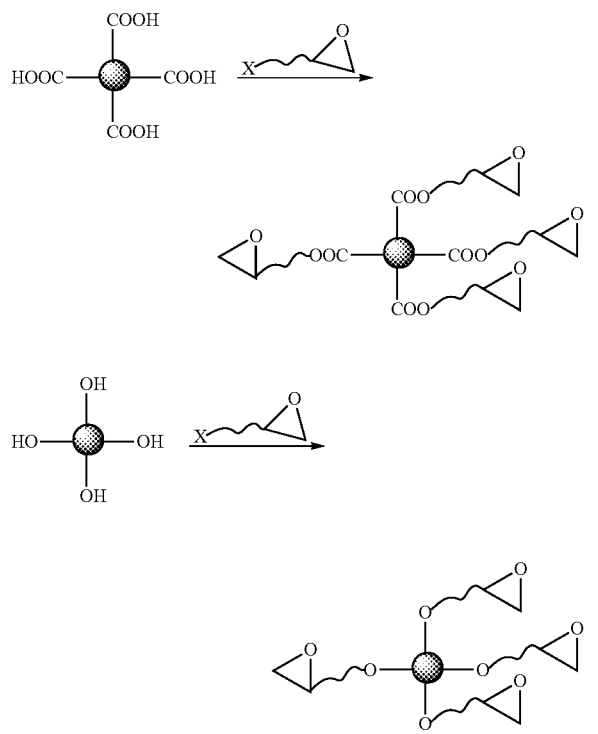

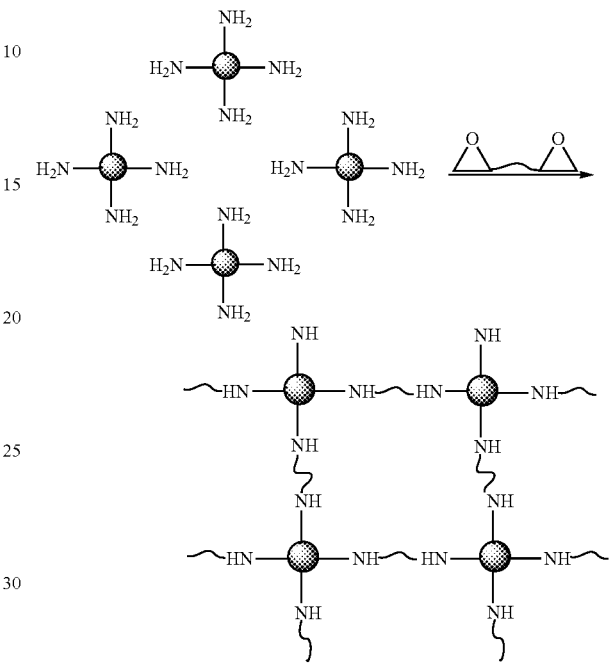

When using epoxy functionalized silica particles, the base material is a hardener material that contains multifunctional amino reagents.

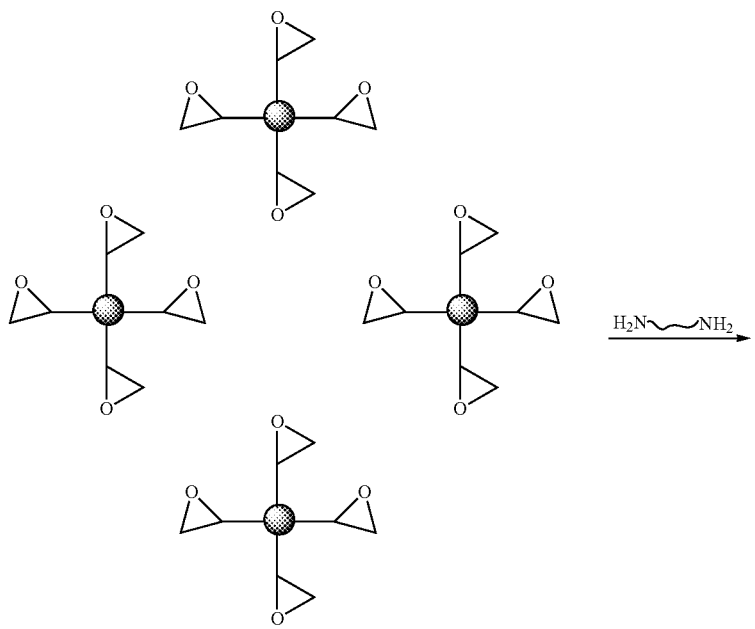

-continued

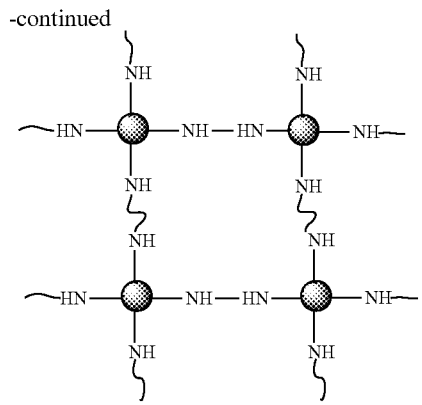

The materials used in some of the embodiments consist of commercially available materials, and a unique, cross-linked silica-polymer structure. High concentration particles will produce ordered, highly packed, particle networks. The direct deposition of this reinforcing layer onto the HDPE provides not only the strength but also the bonding to the HDPE, further increasing the joint's robustness.

An alternative approach would involve fusing the HDPE inner layers to form the fused joint, then wrapping the fused joint with fiber glass mesh. The process would then impregnate the mesh with the polymer and heat cure it. However, this embodiment may take a lot of time, and could result in only a bond between epoxy to epoxy, a mechanically weak interface between the FRP segments. This may result in a joint that has a higher failure rate. The glass epoxy would comprise a glass structure impregnated with epoxy, rather than a mixture of glass and epoxy, as in the previous embodiment.

In this manner, the embodiments here enable fabrication of FRP hydrogen pipeline joints. These joints have outstanding bond strength exceeding current state of the art compression fitting joints. They have better hydrogen leak rates than current compression fitting joints, are corrosion free and allow for contaminant free hydrogen.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of joining fiberglass-reinforced composite pipes, comprising:
   joining an inner tube of each pipe by fusion to form a fused inner bond;
   joining the pipes by depositing a silica glass particle epoxy consisting of functionalized silica particles dispersed into an amino functionalized hardener mixed prior to bonding with an epoxy directly on the fused bond and on bonded edges of a fiber glass composite layers of each pipe as a composition to cover pipe edges and the fused inner tube bond; and
   curing the composition.

2. The method of claim 1, wherein the inner tube comprises a high-density polyethylene layer.

3. The method of claim 1, wherein curing the composition comprises curing the composition to form a chemically linked silica particle network reinforced structural layer on the bond.

4. The method of claim 1, wherein curing the composition comprises heat curing the composition.

5. The method of claim 1, wherein the silica glass particles have a shape of one of spherical, cylinder, plate, fiber or random.

6. The method of claim 1, where a concentration of the functionalized silica particles ranges from 10% to 70% concentration.

7. The method in claim 1, wherein the silica glass particles have a maximum size in any one direction is in a range from 5 nm to about 5 microns.

8. The method in claim 1, wherein the silica glass particles have a maximum size in any one direction is in a range from 5 nm to about 50 microns.

9. A joint between two fiberglass-reinforced composite pipes, comprising:
   a fused bond in a gas barrier layer consisting of an inner tube of each pipe fused together; and
   a silica glass epoxy linked particle network of functionalized particles formed directly on the fused bond and on bonded edges of a fiber glass composite layer of the fiberglass-reinforced composite pipes.

10. The joint of claim 9, wherein the silica glass epoxy linked particle network comprises a heat-cured silica particle epoxy between the fiberglass composite layers of the two pipes.

11. The joint of claim 9, wherein silica particles have a shape including spherical, cylinder, plate, fiber or random.

12. The joint of claim 9, wherein a concentration of the functionalized silica particles is comprised in a range from 10% to 70%.

13. The joint of claim 9, wherein a maximum size in any one direction of the silica particles is comprised in a range from 5 nm to about 5 microns.

14. The joint of claim 9, wherein a maximum size in any one direction of the silica particles is comprised in a range from 5 nm to about 50 microns.

15. The method of claim 1 applied to join new pipelines or to repair damaged pipelines.

16. A method of joining fiberglass-reinforced composite pipes, comprising:
   joining an inner tube of each pipe by fusion to form a fused inner bond;
   joining the pipes by depositing a silica glass particle epoxy consisting of functionalized epoxy particles dispersed into an epoxy base material mixed prior to bonding with an amino hardener directly on the fused bond and on edges of a fiber glass composite layers of each pipe-as a composition to cover pipe edges and the fused inner tube bond; and curing the composition.

17. The method as claimed in claim 16, wherein the inner tube comprises a high-density polyethylene layer.

18. The method as claimed in claim 16, wherein curing the composition comprises curing the composition to form a chemically linked silica particle network reinforced structural layer on the bond.

19. The method as claimed in claim 16, wherein curing the composition comprises heat curing the composition.

20. The method as claimed in claim 16, wherein the silica glass particles have a shape of one of spherical, cylinder, plate, fiber or random.

\* \* \* \* \*